(12) United States Patent
Hattar et al.

(10) Patent No.: US 10,291,873 B2
(45) Date of Patent: May 14, 2019

(54) DUAL-SCREEN ELECTRONIC DEVICES

(71) Applicant: Hattar Tanin LLC, Novato, CA (US)

(72) Inventors: Saadeh Hattar, Novato, CA (US); Volodymyr Tanin, Kiev (UA)

(73) Assignee: Hattar Tanin, LLC, Novato, CA (US)

( * ) Notice: Subject to any disclaimer, the term of this patent is extended or adjusted under 35 U.S.C. 154(b) by 0 days.

(21) Appl. No.: 15/357,746

(22) Filed: Nov. 21, 2016

(65) Prior Publication Data

US 2017/0150059 A1 May 25, 2017

Related U.S. Application Data

(60) Provisional application No. 62/257,869, filed on Nov. 20, 2015.

(51) Int. Cl.
H04N 5/445 (2011.01)
G06F 3/0488 (2013.01)
G06F 1/16 (2006.01)
G06F 3/0489 (2013.01)

(52) U.S. Cl.
CPC ....... *H04N 5/44591* (2013.01); *G06F 1/1618* (2013.01); *G06F 1/1643* (2013.01); *G06F 1/1649* (2013.01); *G06F 1/1654* (2013.01); *G06F 3/0489* (2013.01); *G06F 3/04886* (2013.01); *G06F 1/1681* (2013.01)

(58) Field of Classification Search
None
See application file for complete search history.

(56) References Cited

U.S. PATENT DOCUMENTS

| | | | | |
|---|---|---|---|---|
| 2009/0091512 A1* | 4/2009 | Jung | ..................... | G06F 1/1601 345/1.1 |
| 2009/0160864 A1* | 6/2009 | Yamashita | ................ | G06F 3/14 345/501 |
| 2009/0201254 A1* | 8/2009 | Rais | ....................... | G06F 1/1613 345/168 |
| 2010/0245209 A1* | 9/2010 | Miller | .................. | G06F 1/1618 345/1.3 |
| 2011/0285631 A1* | 11/2011 | Imamura | ............... | G06F 1/1616 345/168 |
| 2015/0254045 A1* | 9/2015 | Drake | .................. | G06F 3/1446 345/1.3 |
| 2015/0324162 A1* | 11/2015 | Kim | ..................... | G06F 3/1438 345/169 |

* cited by examiner

*Primary Examiner* — Mark T Monk
(74) *Attorney, Agent, or Firm* — KW Law, LLP

(57) ABSTRACT

Systems and methods for dual-screen electronic devices are provided in which, at a dual-screen electronic device having a first housing and a second housing attached by a hinge, a first processor, a first display mounted to the first housing, where the first display includes a first touch-sensitive surface, a second display mounted to the second housing, and a first memory contained within the first housing, a first user interface is displayed on the first display and a second user interface, different from the first user interface, is displayed on the second display. While displaying the first and second user interfaces, a user input is detected on the first display and, in response, a display of the second user interface, displayed on the second display, is changed. Separately is presented a user-adjustable-keyboard software-application.

13 Claims, 5 Drawing Sheets

DUAL-SCREEN ELECTRONIC DEVICES

CROSS REFERENCE TO RELATED APPLICATION

This application claims priority to U.S. Provisional Patent Application No. 62/257,869, entitled "Secondary Screen for Smartphones, Notebooks, Tablets, Cameras and Other Devices Producing Photo/Video Output and/or Requiring a Keyboard-like Input," filed Nov. 20, 2015, which is hereby incorporated by reference.

TECHNICAL FIELD

This specification describes electronic devices and systems with two displays.

BACKGROUND

Portable electronic devices like smartphones, tablets, and other devices are often used to make photo or video and/or to input text. However, it is not possible to view a digital image being captured by these portable electronic devices from angles opposite the display mounted on the device. Further, composition on electronic devices with touch screens is hindered by the amount of available space to display the document being composed and an electronic keyboard. Moreover, conventional electronic keyboards are not customizable, other than display in one of a limited number of preset views (e.g., portrait mode, landscape mode, and split keyboard mode.

SUMMARY

The present disclosure solves these and other problems by providing electronic devices having at least two displays. In some embodiments, the screens are rotatable and/or detachable from each other. In some embodiments, the electronic device displays a document being composed on a first display and an electronic keyboard on a second display. In some embodiments, the size of the electronic keyboard is adjustable by a user.

The following presents a summary of the present disclosure in order to provide a basic understanding of some of the aspects of the present disclosure. This summary is not an extensive overview of the present disclosure. It is not intended to identify key/critical elements of the invention or to delineate the scope of the invention. Its sole purpose is to present some of the concepts of the present disclosure in a simplified form as a prelude to the more detailed description that is presented later.

Various embodiments of systems, methods and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various embodiments are used.

In one aspect, the disclosure provides a dual-screen electronic device having a first housing and a second housing attached by a hinge, a first processor (e.g., a first set of one or more processors) contained within the first housing, a first display mounted to the first housing and in electronic communication with the first processor, where the first display includes a first touch-sensitive surface (e.g., the first display is a touchscreen), a second display mounted to the second housing and in electronic communication with the first processor, and a first memory contained within the first housing and in electronic communication with the first processor, the first memory storing non-transitory instructions which, when executed by the first processor, cause the dual-screen electronic device to display a first user interface on the first display, display a second user interface, different from the first user interface, on the second display, and while displaying the first user interface on the first display and the second user interface on the second display, responsive to detecting a first user input on the first display, changing a display of the second user interface on the second display.

A secondary screen for devices like smartphones, notebooks, tablets as well as digital cameras is provided. The device equipped by the secondary screen may have a form factor of a clamshell (flip), which means that it is in two or more main sections that fold via a hinge/joint-hinge. The sections may be attached to each other on long or on a short edge of the device. The hinge/joint may be constructed in such a way that the sections may be attached to any of two neighboring edges. The sections can be fixed at any angles/positions between them. The angle between the sections may reach 360°, when the screens are oriented in the opposite directions. The sections may be detachable. In this case they are connected wirelessly. They may be also connected by wire at some distance. Detail with joint/hinge which provides connection (physical and/or wire/information/energy transfer) between the sections may be also detachable.

In some embodiments, the secondary screen may be used to demonstrate the output of the photo/video camera(s) of the device. The secondary screen may be also used as an adjustable keyboard. Size, position and shape of any button(s) may be specified by the user. The secondary screen keyboard may also have user defined buttons. User defined buttons may be used to enter any symbols specified by the user or launch any programs/commands or sequences of programs/command specified by the user. Digital camera may be also equipped with the secondary screen. The secondary screen is used to demonstrate the picture from the camera to the person(s) being shot or to somebody else located at some distance.

In some embodiments, the disclosure provides a secondary screen for devices like smartphones, notebooks, and tablets. The device equipped by the secondary screen may have a form factor of a clamshell (flip), which means that it is in two or more main sections that fold via a hinge/joint-hinge. The sections may be attached to each other on long or on a short edge of the device. The hinge/joint may be constructed in such a way that the sections may be attached to any of two neighboring edges. The sections can be fixed at any angles/positions between them. The angle between the sections may reach 360°, when the screens are oriented in the opposite directions. The sections may be detachable. In this case they are connected wirelessly. They may be also connected by wire at some distance. Detail with joint/hinge which provides connection (physical and/or wire/information/energy transfer) between the sections may be also detachable. The device may have more than one secondary screen.

In some embodiments, the secondary screen is used to demonstrate the output of the photo/video camera(s) of the device. In some embodiments, two or more secondary screens are used.

In some embodiments on the second screen or as separately functioning software (or additional software functionality, implemented into programs such as MICROSOFT WORD or EXCEL, or other programs such as ADO-BEREADER) for touchscreen/touch-surface devices user-adjustable keyboard can be used. Size, position and shape of any button may be specified by the user. The user-adjustable-keyboard (hereinafter named as user-adjustable-keyboard or adjustable-keyboard, or second screen keyboard) may also have user defined buttons. User defined buttons may be used to enter any symbols specified by the user and/or launch any programs/commands, and/or sequences of programs/command specified by the user, and/or any button of the adjustable keyboard can be provided with any number of switchable symbols/commands, and/or any menu button of any program may be appointed/converted into a button of the adjustable keyboard. The screen with the adjustable keyboard may have a small part(s) showing the specified zone(s) of the main screen and/or the part of the main screen where editing is taking place. Part of the screen with above keyboard may be used as a touch-pad to use it as a mouse-like pointing device. Size, position and properties (like speed of mouse pointer in different zones) of this part of the secondary screen may be adjustable by the user. User-adjustable keyboard may be realized for any touchscreen/touch-surface devices, including with a single touchscreen/touch-surface. One or more secondary screens may be used.

In some embodiments, the disclosure provides a digital camera equipped with the secondary screen(s). The secondary screen(s) is(are) used to demonstrate the picture from the camera to the person(s) being shot and/or to somebody else located at some distance. One or more secondary screens may be used.

In some embodiments, the device with a secondary screen(s) that can be made of two (or more) independent devices. They may have a possibility to be connected to each other by a kind of join/hinge and/or may have only wireless connection. One of the devices functions as secondary screen. In this case special software is required.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

DETAILED DESCRIPTION

Reference will now be made in detail to implementations of the present application as illustrated in the accompanying drawings. The same reference indicators will be used throughout the drawings and the following detailed description to refer to the same or like parts. Those of ordinary skill in the art will realize that the following detailed description of the present application is illustrative only and is not intended to be in any way limiting. Other embodiments of the present application will readily suggest themselves to such skilled persons having benefit of this disclosure.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Portable electronic devices (e.g., laptop computers, smartphones, notebooks, tablets, cameras, etc.) having two displays (e.g., a secondary screen) are provided by the present disclosure. The screens are connected through a hinge or joint allowing them to rotate relative to one another.

In some embodiments, the disclosure provides a secondary screen for devices like smartphones, notebooks, tablets as well as digital cameras is proposed. The device equipped by the secondary screen may have a form factor of a clamshell (flip). The sections may be attached to each other on long or on a short edge of the device. The angle between the sections may reach 360°, when the screens are oriented in the opposite directions. The sections may be detachable. The secondary screen(s) of may be used to demonstrate the output of the photo/video camera(s) of the device. Digital camera may be also equipped with the secondary screen(s). The secondary screen(s) is/are used to demonstrate the picture from the camera to the person(s) being shot or to somebody else located at some distance. On the second screen or as separately functioning software (or additional software functionality, implemented into programs MICROSOFT WORD or EXCEL, or other programs such as ADO-BEREADER) for touchscreen/touch-surface device(s) the user-adjustable keyboard can be used. Size, position, function and shape of any button may be specified by the user.

Figure 1:
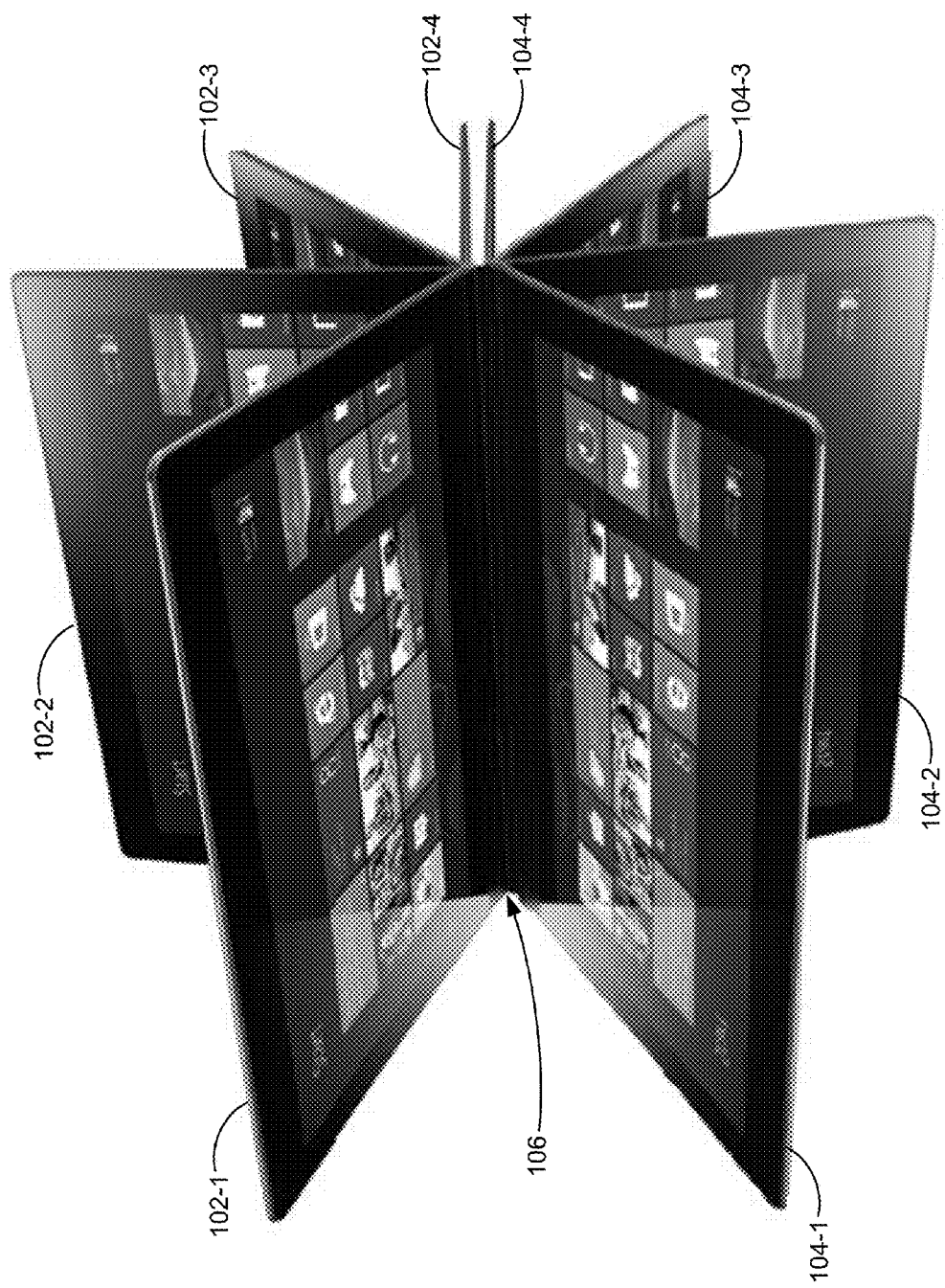
FIG. 1 illustrates a dual-screen electronic device having two displays in a clamshell orientation capable of being rotated about a hinge connecting the two displays, in accordance with some implementations of the present disclosure.
Figure 3:
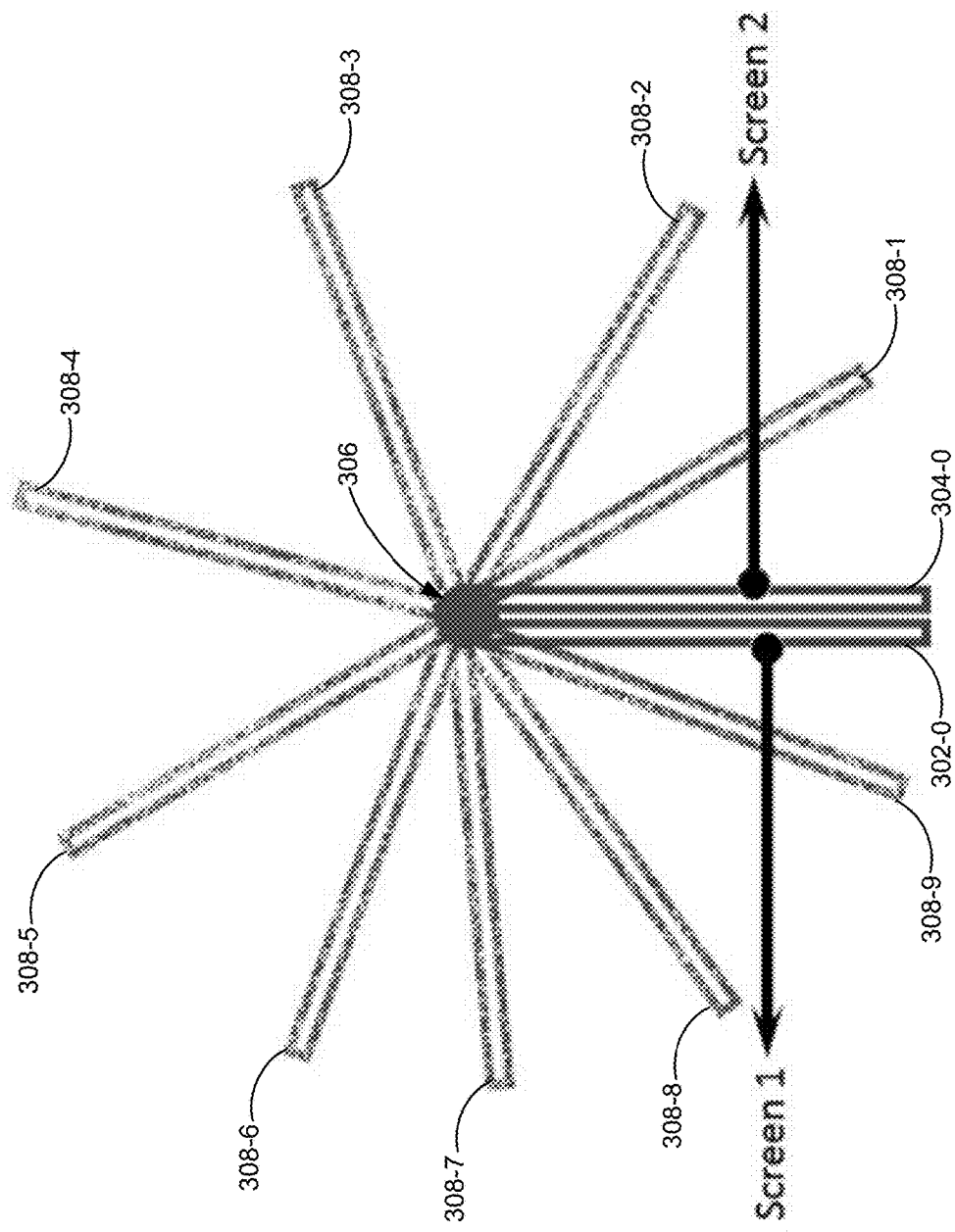
FIG. 3 illustrates a side view of a dual-screen electronic device having two displays in a clamshell orientation capable of being rotated about a hinge connecting the two displays, in accordance with some implementations of the present disclosure.

Referring to FIGS. 1 and 3, in some embodiments, the screens (e.g., screens 102 and 104 in FIG. 1 and screens 302 and 304 in FIG. 3) of the portable electronic device are arranged in a clamshell orientation, joined at a hinge (e.g., hinge 106 in FIG. 1 and hinge 306 in FIG. 3) such that one or both of the screens are rotatable about the hinge. In some embodiments, as illustrated in FIGS. 1 and 3, the screens are attached to each other through a hinge disposed along a long edge of each screen. In other embodiments, the screens are attached through a hinge disposed along a short edge of each screen. In some embodiments, the sections (e.g., screens) can be fixed at any angles/positions relative to one another. In some embodiments, the angle between the sections (e.g., screens) may reach 360°, when the screens are oriented in the opposite directions (e.g., as shown in FIG. 1 when the screens are at positions 102-4 and 104-4, respectively, and as shown in FIG. 3 when the screens are at positions 302-0 and 304-0, respectively).

Figure 2:
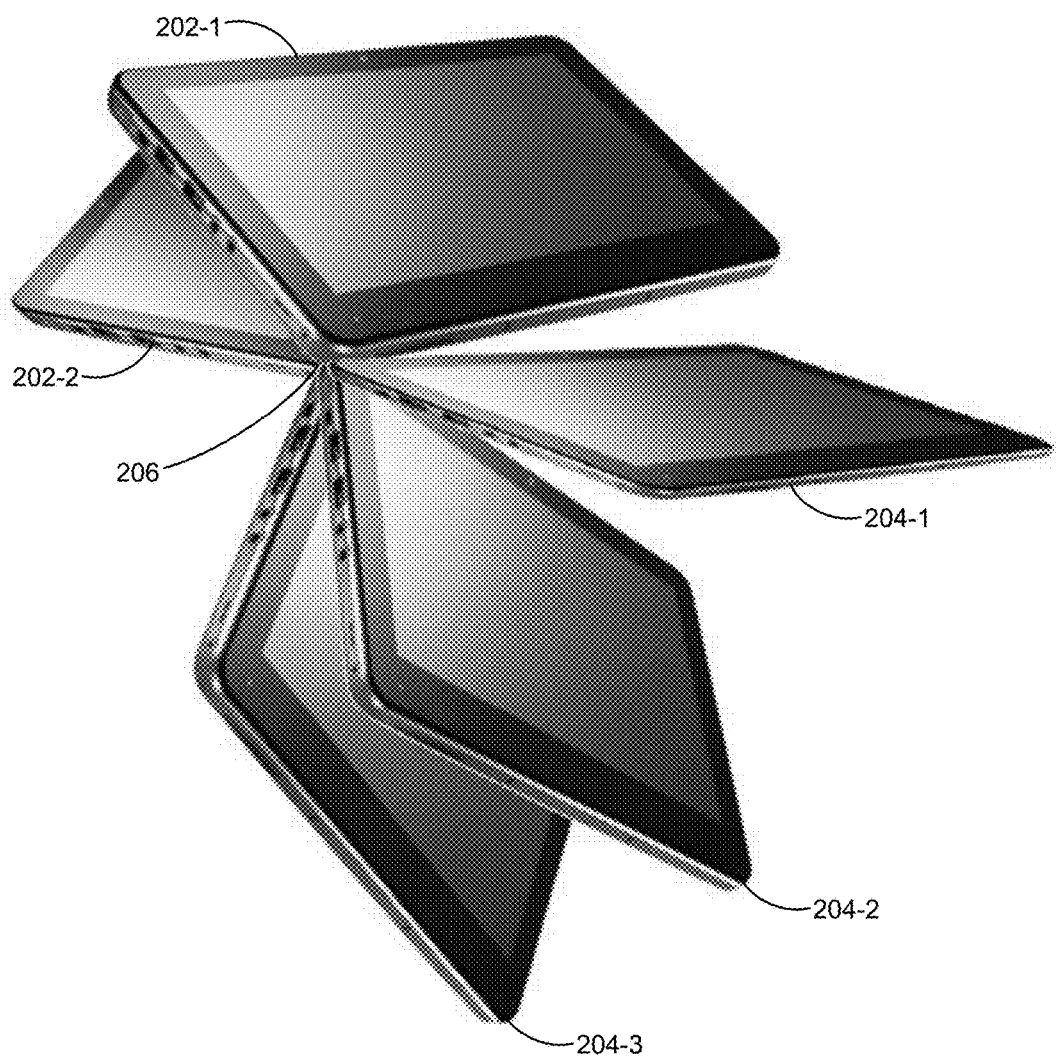
FIG. 2 illustrates a dual-screen electronic device having two displays connected with a rotatable hinge at a single corner on each display, in accordance with some implementations of the present disclosure.

Referring to FIG. 2, in some embodiments, the screens (e.g., screens 202 and 204) of the portable electronic device are joined at a joint (e.g., joint 206) attached to a single point on each screen (e.g., at a corner of each screen). In some embodiments, when the screens are joined at a single point, the screens may rotate about more than one axis relative to each other. For example, as illustrated in FIG. 2, screen 202 rotates away (e.g., along an x-axis) from screen 204 and then twists (e.g., along a z-axis) to face left, when moving from position 202-1 to position 202-2.

In some embodiments, the two screens are in wired communication (e.g., one display is in electronic communication with one or more processors located in a housing to which the other screen is mounted) through a connection (e.g., communication bus) spanning the hinge or joint connecting the two screens (e.g., through a communication bus passing through hinge 106 in FIG. 1). In some embodiments, the two screens are in wireless communication with each other. In some embodiments, one screen is detachable from the other and the screens are in wireless communication when detached. In some embodiments, where one screen is detachable from the other screen, the screens are in wired communication when attached (e.g., the hinge or joint attaching the two screens includes a communications docking mechanism bringing the two screens into wired communication with each other).

Figure 5:
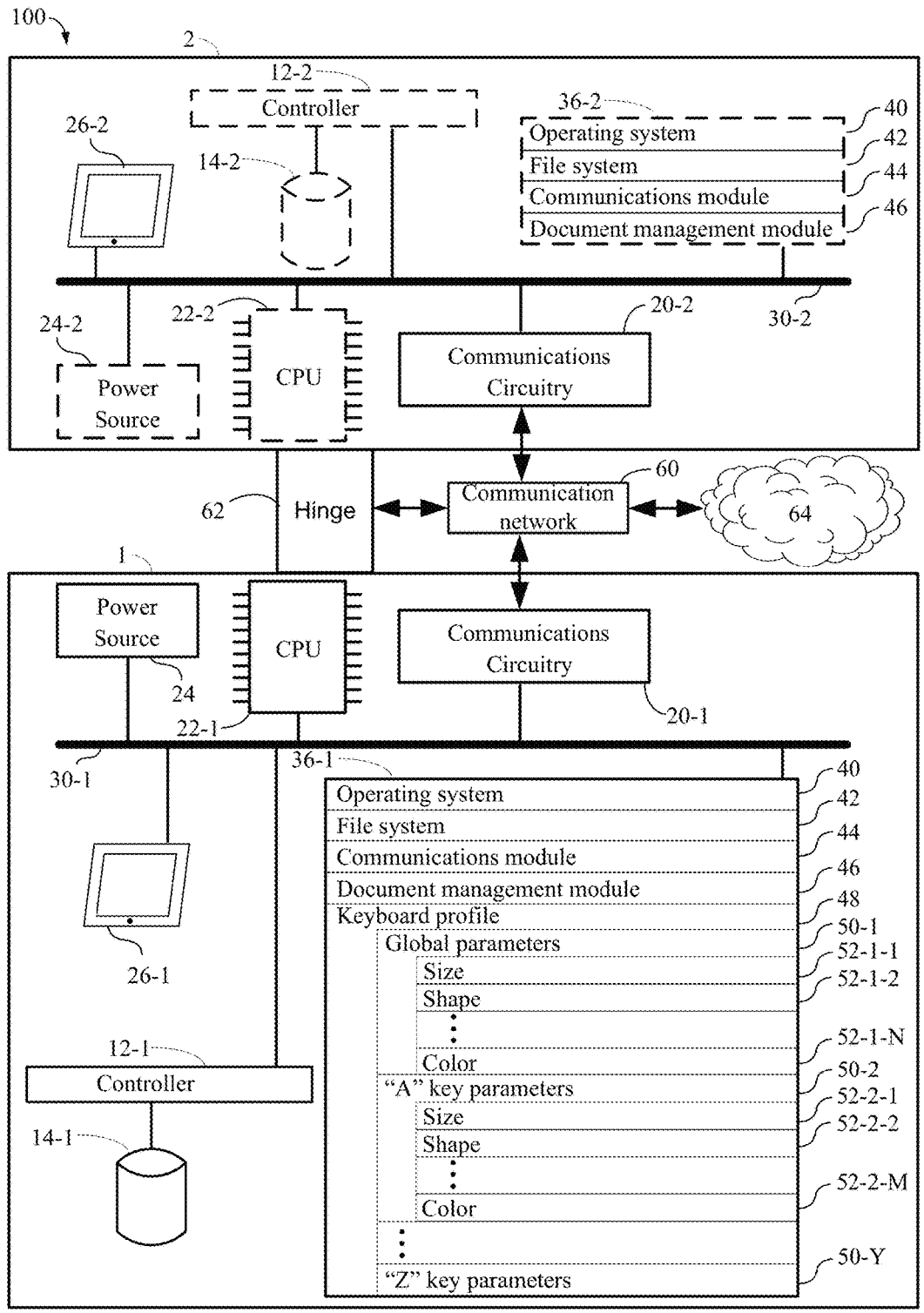
FIG. 5 is a block diagram of an exemplary dual-screen electronic device, in accordance with some implementations of the present disclosure

In some embodiments, one screen is powered by a power source located within a housing to which the other screen is mounted, and a connection to the power occurs through the hinge or joint connecting the two screens. For example, in some embodiments, screen 26 mounted to housing 2 is powered by power source 24 within housing 1, through a connection transversing hinge 62, as illustrated in FIG. 5.

Figure 4:
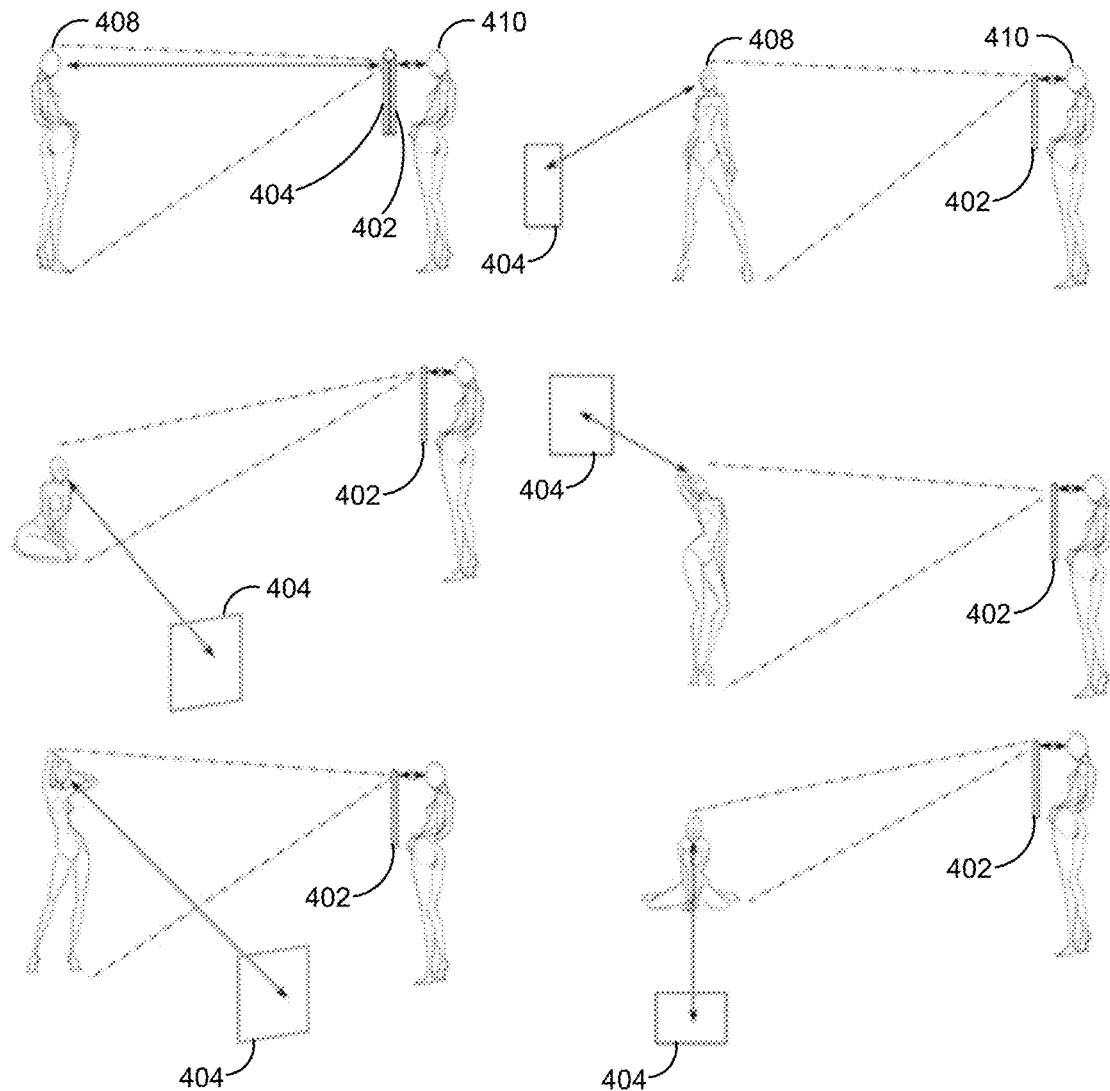
FIG. 4 illustrates use of a detached second screen for viewing images and video being recorded by the electronic device, in accordance with some implementations of the present disclosure.

Referring to FIG. 4, in some embodiments, a photo, live image, video, etc., captured by a digital camera within a dual-screen electronic device of the disclosure is transmitted to one or both of the two screens (e.g., screens 404 and 402). For example, as illustrated in the upper left panel of FIG. 4, where the screens are positioned back-to-back relative to one another (e.g., at an angle of about 360° relative to a closed configuration where the two screens are directly facing one another), the person(s) 408 who is the subject of the photo/video to view the image at the same time as the person 410 taking the image. This allows the subject 408 to see how they look in the photo and/or video (e.g., to assess the quality of shooting). If the screens are detached, as illustrated in the other panels of FIG. 4, one screen 404 can be located in view of the person(s) 408 who is the subject of photo/video. This allows the subject to see how they look in the photo and/or video (e.g., to assess the quality of shooting) when not looking in the direction of the digital camera (e.g., within the housing to which screen 402 is mounted). For example, in the upper right panel of FIG. 4, subject 408 can view (e.g., in real-time) an image being acquired by a digital camera associated with screen 402, while facing away from the camera, by looking a second screen 404 that is detached from screen 402. The device is unique for photo and/or video shooting. For example, when taking a "selfie", the detachable secondary screen may be attached to the opposite side of a selfie stick (e.g., near the user) to allow the user to see the image being acquired. In some embodiments, more than one secondary screen may be used, e.g., positioned at different locations and angles relative to a subject being acquired. This allows them to see their image without turning their head(s)

In some embodiments, a secondary screen(s) may be used with photo/video cameras for the same purposes and in the same way (in some embodiments, the photo/video camera will include a first display mounted on the camera). In this case the secondary screen(s) should be detachable or provided as separate detail(s). The secondary screen(s) may be of a bigger size. The secondary screen(s) allow(s) the person(s) being shot to estimate the quality of shooting. If the secondary screen(s) is/are big enough it may be located near the photographer/camera man or even behind him. Such device will be very helpful for professional photographers, film makers and for models (e.g. fashion models being shot). Several (more than one) secondary screens may be used in this case as well. They may be located at different directions/locations around the photographed/filmed person.

In some embodiments, on the second screen or as separately functioning software (or additional software functionality, implemented into programs MICROSOFT WORD or EXCEL, or other programs such as ADOBEREADER) for touchscreen/touch-surface device(s) the user-adjustable keyboard can be used (e.g., to use for composition of a document displayed on the first screen. In some embodiments, the size of the electronic keyboard displayed on the second screen can be enlarged or shrunk by a user, e.g., to configure the keyboard to the size of the user's hands. This will reduce the number of misprints caused by hitting a wrong button and/or provide possibility of quicker typing as soon as sizes of keyboard buttons and their locations are adjusted under exact user. In some embodiments, more than one secondary screen can be used to display one or more electronic keyboards.

In some embodiments, each key on the electronic keyboard is individually customizable. In some embodiments, the size, position, color, and/or shape of any button(s) may be specified by the user. In some embodiments, when a single key on the keyboard is customized by a user, the device automatically customizes one or more other keys on the keyboard in a similar fashion (e.g., all keys on the keyboard, all number keys, all letter keys, all punctuation, etc.).

In some embodiments, one or more user-defined keys may be added to the electronic keyboard. In some embodiments, a user-defined button is associated with one or more of the following functions:
  entering non-standard symbols (mathematical, physical, financial, letters or pictograms from different languages);
  launching different programs and/or commands;
  launching macros (e.g., sequences of programs and/or commands);
  any menu button of any program may be appointed/converted into button of the adjustable keyboard; and
  any button of the adjustable keyboard can be provided with any number of switchable symbols/commands.

In some embodiments, the screen displaying an electronic keyboard also displays a specified portion of the document being drafted on the other screen (e.g., a portion of the document being composed/edited).

In some embodiments, the secondary screen, or a portion thereof, is configured as a touch-pad to direct a cursor displayed on the primary (e.g., other) screen. In some embodiments, the size of the touch-pad area (e.g., the portion of the display dedicated to act as a touchpad, speed of mouse-pointer in different zones) is adjustable by the user.

Other screen(s) may also be located on the place of any other surface(s) without screen(s). In some embodiments, the device with a secondary screen(s) can be made of two (or more) independent devices. They may have a possibility to be connected to each other by a kind of join/hinge and/or may have only wireless connection. One of the devices functions as the secondary screen. In this case special software is required.

FIG. 5 is an example block diagram illustrating an electronic device 100, in accordance with some implementations of the present disclosure. The electronic device 100 in some implementations includes two housings 1 and 2 connected by a hinge 62, one or more processing units (CPU(s)) 22 (also referred to as processors), one or more network interfaces 20, two or more displays 26 (e.g., one mounted to each of housing 1 and 2), one or more memory 36, one or more communication buses 30 for interconnecting these components, and one or more power sources 24 for powering these components. The communication buses 30 optionally include circuitry (sometimes called a chipset) that interconnects and controls communications between system components. The memory 36 typically includes high-speed random access memory, such as DRAM, SRAM, DDR RAM or other random access solid state memory devices, and optionally includes non-volatile memory 14, such as one or more magnetic disk storage devices, flash memory devices, or other non-volatile solid state storage devices optionally accessed by a controller 12. The memory 36 optionally includes one or more storage devices remotely located from the CPU(s) 22. The memory 36, or alternatively the non-volatile memory device(s) within the memory 36, comprises a non-transitory computer readable storage medium. In some implementations, the memory 36 or alternatively the non-transitory computer readable storage medium stores the following programs, modules and data structures, or a subset thereof:
- optionally, an operating system 40, which includes procedures for handling various basic system services and for performing hardware dependent tasks;
- optionally, a file system 42 which may be a component of operating system 40, for managing files stored or accessed by the electronic device 100;
- a communications module (or instructions) 44 for connecting a CPU located within one of housing 1 or 2 with a display 26 mounted to the other housing and, optionally, with other devices via one or more network interfaces 20 (wired or wireless), and/or a communication network 60, optionally including a delocalized communications network 64. In some embodiments, communications circuitry includes a wired communication between the first housing 1 and the second housing 2, through the hinge 62;
- a document management module 46 for drafting, editing, and reviewing user-generated documents; and
- an electronic keyboard management module 48 for customizing an electronic keyboard displayed in a first user interface, the keyboard profile 48 including:
  - one or more global keyboard parameters 50-1 customizable by the user including, for example, a size of the keyboard 52-1-1, a shape of the keyboard 52-1-2, a color of the keyboard 52-1-N, etc.; and
  - one or more individual key parameters 50-2 et seq. customizable by the user including, for example, a size of a key 52-2-1, a shape of a key 52-2-2, a color of a key 52-2-M, etc.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 36 optionally stores a subset of the modules and data structures identified above. Furthermore, the memory 36 may store additional modules and data structures not described above.

Exemplary Embodiments

In one aspect, the disclosure provides a dual-screen electronic device (e.g., a portable electronic device such as a smartphone, tablet, laptop, personal assistant, digital camera, etc.) including a first housing (e.g., housing 1 in FIG. 5) and a second housing (e.g., housing 2 in FIG. 5) attached by a hinge (e.g., hinges 106, 206, 306, or 62 in FIGS. 1, 2, 3, and 5, respectively). The device includes a first processor (e.g., a first set of one or more processors) contained within the first housing (e.g., CPU 22-1 in FIG. 5). The electronic device also includes a first display mounted to the first housing (e.g., display 102, 202, 302, 402, and 26-1 in FIGS. 1-5, respectively) and in electronic communication with the first processor (e.g., CPU 22-1). The first display 26-1 includes a first touch-sensitive surface (e.g., the first display is a touchscreen display).

The dual-screen electronic device also includes a second display (e.g., display 104, 204, 304, 404, and 26-2 in FIGS. 1-5, respectively) mounted to the second housing and in electronic communication with the first processor (e.g., CPU 22-1 in FIG. 5). The device further includes a first memory contained within the first housing (e.g., memory 36-1 in FIG. 5) and in electronic communication with the first processor (e.g., CPU 22-1 in FIG. 5), the first memory storing non-transitory instructions which, when executed by the first processor (e.g., CPU 22-1 in FIG. 5), cause the dual-screen electronic device to: display a first user interface (e.g., a user interface for an electronic keyboard) on the first display including the first touch-sensitive surface (e.g., display 102, 202, 302, 402, and 26-1 in FIGS. 1-5, respectively), display a second user interface (e.g., a user interface for a composition document, such as a letter), different from the first user interface, on the second display (e.g., display 104, 204, 304, 404, and 26-2 in FIGS. 1-5, respectively), while displaying the first user interface on the first display including the first touch-sensitive surface and the second user interface on the second display, responsive to detecting a first user input on the first display including the first touch-sensitive surface (e.g., detecting selection of a key on an electronic keyboard), changing a display of the second user interface on the second display (e.g., inserting the letter associated with the selected key into a document displayed on the second display).

In some embodiments of the dual-screen electronic devices described herein, the second housing is rotatable by at least 350 degrees (e.g., from a first orientation directly facing the first housing to a second orientation facing directly away from the first housing, as illustrated in FIGS. 1 and 3) about an axis defined by the hinge (e.g., hinge 106 or 306 in FIGS. 1 and 3, respectively), relative to the first housing.

In some embodiments of the dual-screen electronic devices described herein, the hinge (e.g., joint or hinge 206 in FIG. 2) is attached to only a first corner of the first housing and only a first corner of the second housing (e.g., as illustrated in FIG. 2). The second housing is rotatable about a plurality of axes transversing the hinge. For example, as illustrated in FIG. 2, screen 202 rotates away (e.g., along an x-axis) from screen 204 and then twists (e.g., along a z-axis) to face left, when moving from position 202-1 to position 202-2.

In some embodiments of the dual-screen electronic devices described herein, the second display (e.g., display 404 or 26-2 in FIGS. 4 and 5, respectively) is in wireless communication with the one or more processors. One or more of the first housing and the second housing are detachable from the hinge (e.g., as shown by the detached housings in FIG. 4).

In some embodiments of the dual-screen electronic devices described herein, the second user interface displayed on the second display includes a user-composed document (e.g., a letter, drawing, picture, music score, etc.), the first user interface displayed on the first display comprising the first touch-sensitive surface includes a plurality of document inputs (e.g., an electronic alpha-numeric keyboard, a paint pallet, a musical keyboard, etc.), and responsive to detecting a first user input at a location on the first display corresponding to a first respective document input in the plurality of document inputs (e.g., detecting a user tap on a letter in an electronic keyboard), updating the user-composed document displayed on the second display to include the first respective document input (e.g., adding the selected letter to a composition document).

In some embodiments of the dual-screen electronic devices described herein, the plurality of document inputs displayed by the first display including the first touch-sensitive surface is an electronic alpha-numeric keyboard comprising a plurality of electronic keys, and at least one electronic key in the plurality of electronic keys is customizable (e.g., shape, size, corresponding input, etc.) by the user. For example, in some embodiments, memory 36 includes an electronic keyboard profile 48, which may be customized globally by adjusting a global parameter 50-1 (e.g., a size, shape, color, etc. of the keyboard). In some embodiments, individual keys may also be customized by adjusting a key-specific parameter 50-2 et seq. (e.g., a size shape, color, etc. for an individual key). In some embodiments, responsive to user customization of a first electronic key (e.g., changing "A" key parameters 50-2), the device automatically changes one or more other keys (e.g., all other letter keys 50-3 to 50-Y) in a similar or same fashion. In some embodiments user-adjustable keyboard can be realized as a separately functioning software or additional software functionality, implemented into programs (such as MICROSOFT WORD or EXCEL, or other programs such as ADOBEREADER) for touchscreen/touch-surface device(s).

In some embodiments of the dual-screen electronic devices described herein, the first user interface displayed on the first display including the first touch-sensitive surface further includes an area(s) configured to function as a touch-pad for manipulating a cursor displayed within the second user interface displayed on the second display or on touch surface. For example, in some embodiments, the first screen displays an electronic keyboard in a first area of the screen and an electronic touch-pad in a second area of the screen, allowing a user to type and edit content displayed on the second screen.

In some embodiments, the second user interface displayed on the second display includes a user-composed document, and the first user interface displayed on the first display comprising the first touch-sensitive surface further includes an area configured to display a portion of the user-composed document displayed on the second display.

In some embodiments of the dual-screen electronic devices described herein, the device includes a second processor (e.g., a second set of one or more processors) contained within the second housing (e.g., optional CPU 22-2 in housing 2 in FIG. 5) and in electronic communication with the second display (e.g., display 26-2 in FIG. 5), where the second display comprises a second touch-sensitive surface (e.g., a user can type on an electronic keyboard displayed on the first screen and navigate (e.g., scroll, highlight, insert/move a cursor, etc.) directly on the document displayed on the second screen). The device also includes a second memory (e.g., optional memory 36-2 in FIG. 5) contained within the second housing and in electronic communication with the second processor, the second memory storing non-transitory instructions which, when executed by the second processor, cause the dual-screen electronic device to: while displaying the first user interface (e.g., an electronic keyboard and optionally an electronic touchpad) on the first display (e.g., display 26-1 in FIG. 5) including the first touch-sensitive surface and the second user interface (e.g., for a composition document) on the second display: responsive to detecting a second user input on the second display including the second touch-sensitive surface (e.g., tapping on a word in a composition document, etc.), changing a display of the second user interface on the second display (e.g., highlighting a passage of a letter, placing a cursor, drawing on a picture, modifying a score, etc.).

In another aspect, the present disclosure provides a digital camera system including a digital camera having a first housing, an image acquisition subsystem contained within the first housing, the image acquisition subsystem configured to acquire a digital image of a field of view defined by a lens of the image acquisition subsystem, one or more processors in electronic communication with the image acquisition subsystem, and a memory, the memory storing non-transitory instructions which, when executed by the first processor, cause the digital camera to: acquire a live digital image of the field of view (e.g., a live image, a single digital image, or a movie, etc.), and transmit the live digital image of the field of view to a portable electronic device. The digital camera system also includes a portable electronic device having a second housing, and a display mounted to the second housing, the display in wireless communication with the digital camera, where the display is configured to display the live digital image of the field of view transmitted from the digital camera in real-time.

In another aspect, the present disclosure provides a customizable digital keyboard. In some embodiments, the disclosure provides a non-transitory computer readable storage medium storing one or more programs, the one or more programs including instructions, which when executed by an electronic device with a touchscreen display cause the electronic device to display a digital alpha-numeric keyboard having a plurality of electronic keys at a first size in a plurality of sizes on the touchscreen display, while displaying the digital alpha-numeric keyboard, responsive to detecting a user input satisfying display-changing criteria, changing display of the digital alpha-numeric keyboard to a second size in the plurality of sizes, where the second size is selectable by a user.

In some embodiments, changing display of the alphanumeric keyboard to a second size consists of changing a size of a first electronic key in the plurality of electronic keys.

In some embodiments, the storage media further includes instructions causing the electronic device to, after changing the size of the first electronic key in the plurality of electronic keys in response to detecting the user input satisfying the display-changing criteria, automatically change a size of a second electronic key in the plurality of electronic keys in accordance with the change in size of the first electronic key.

In some embodiments, the digital alpha-numeric keyboard includes a user-defined electronic key in the plurality of electronic keys, the user-defined electronic key corresponding to one or more actions on the electronic device selected from launching a program, performing a macro, inserting a non-standard character into a user-composed document, and displaying a menu.

In some embodiments, the electronic alphanumeric keyboard is displayed in a first area of the display, the non-transitory computer readable storage media further including instructions causing the electronic device to display, in a second area of the display, a digital touch-pad for manipulating a cursor on the display.

CONCLUDING REMARKS

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

Memory optionally includes high-speed random access memory and optionally also includes non-volatile memory, such as one or more magnetic disk storage devices, flash memory devices, or other non-volatile solid-state memory devices. Access to memory by other components of device, such as one or more processors and a peripherals interface, is, optionally, controlled by a memory controller.

A peripherals interface can be used to couple input and output peripherals of the device to one or more processors and memory. The one or more processors run or execute various software programs and/or sets of instructions stored in memory to perform various functions for device and to process data.

Each of the above identified modules and applications correspond to a set of executable instructions for performing one or more functions described above and the methods described in this application (e.g., computer-implemented methods). These modules (i.e., sets of instructions) need not be implemented as separate software programs, procedures or modules, and thus various subsets of these modules are, optionally, combined or otherwise re-arranged in various embodiments. In some embodiments, memory optionally stores a subset of the modules and data structures identified above. Furthermore, memory optionally stores additional modules and data structures not described above.

Accordingly, in other embodiments, the present disclosure provides electronic devices including one or more processors, memory, and at least two displays, where the memory includes instructions for performing all or a portion of one or more methods described herein.

In other embodiments, the present disclosure provides computer readable storage medium (e.g., non-transitory medium) storing one or more programs, the one or more programs including instructions, which when executed by an electronic device with one or more processors and at least two displays, cause the device to perform all or a portion of one or more methods described herein.

In other embodiments, the present disclosure provides methods that, when performed at an electronic device including one or more processors, memory, and at least two displays, performs all or a portion of the functions described herein.

It will also be understood that, although the terms "first," "second," etc. may be used herein to describe various elements, these elements should not be limited by these terms. These terms are only used to distinguish one element from another. For example, a first object could be termed a second object, and, similarly, a second object could be termed a first object, without changing the meaning of the description, so long as all occurrences of the "first object" are renamed consistently and all occurrences of the "second object" are renamed consistently. The first object and the second object are both objects, but they are not the same object.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, software, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A dual-screen electronic device comprising:
a first housing and a second housing attached by a hinge;
a first processor contained within the first housing;
a first display mounted to the first housing and in electronic communication with the first processor, wherein the first display comprises a first touch-sensitive surface;
a second display mounted to the second housing and in electronic communication with the first processor, wherein the second display comprises a second touch-sensitive surface;
a first communications bus disposed in the first housing and configured to enable electronic communication between the first display, the second display and a network;
a second communication bus disposed in the second housing and configured to enable electronic communication between the first display, the second display, and the network,
wherein the first communications bus and the second communications bus are configured to transmits inputs received between the first display and the second display based on a type of input received and a location of the input;
a first power source disposed in the first housing and configured to power the first display;
a second power source disposed in the second housing and configured to power the second display; and
a first memory contained within the first housing and in electronic communication with the first processor, the first memory storing non-transitory instructions which, when executed by the first processor, cause the dual-screen electronic device to:
display a first user interface on the first display comprising the first touch-sensitive surface;
display a second user interface, different from the first user interface, on the second display;
while displaying the first user interface on the first display comprising the first touch-sensitive surface and the second user interface on the second display:
responsive to detecting a first user input on the first display comprising the first touch-sensitive surface, changing content of the second user interface on the second display.

2. The dual-screen electronic device of claim 1, wherein the second housing is rotatable by at least 350 degrees about an axis defined by the hinge, relative to the first housing.

3. The dual-screen electronic device of claim 1, wherein:
the hinge is attached to only a first corner of the first housing and only a first corner of the second housing, and
the second housing is rotatable about a plurality of axes transversing the hinge.

4. The dual-screen electronic device of claim 1, wherein:
the second display is in wireless communication with the one or more processors, and one or more of the first housing and the second housing are detachable from the hinge.

5. The dual-screen electronic device of claim 1, wherein:
the second user interface displayed on the second display includes a user-composed document,
the first user interface displayed on the first display comprising the first touch-sensitive surface includes a plurality of document inputs, and
responsive to detecting a first user input at a location on the first display corresponding to a first respective document input in the plurality of document inputs, updating the user-composed document displayed on the second display to include the first respective document input.

6. The dual screen electronic device of claim 5, wherein:
the plurality of document inputs displayed by the first display comprising the first touch-sensitive surface is an electronic alpha-numeric keyboard comprising a plurality of electronic keys, and
wherein at least one electronic key in the plurality of electronic keys is customizable by the user.

7. The dual-screen electronic device of claim 6, wherein the first user interface displayed on the first display comprising the first touch-sensitive surface further includes an area configured to function as a touch-pad for manipulating a cursor displayed within the second user interface displayed on the second display.

8. The dual-screen electronic device of claim 6, wherein:
the second user interface displayed on the second display includes a user-composed document, and
the first user interface displayed on the first display comprising the first touch-sensitive surface further includes an area configured to display a portion of the user-composed document displayed on the second display.

9. The dual screen electronic device of claim 1, further comprising:
a second processor contained within the second housing and in electronic communication with the second display, and
a second memory contained within the second housing and in electronic communication with the second processor, the second memory storing non-transitory instructions which, when executed by the second processor, cause the dual-screen electronic device to:
while displaying the first user interface on the first display comprising the first touch-sensitive surface and the second user interface on the second display:
responsive to detecting a second user input on the second display comprising the second touch-sensitive surface, changing a display of the second user interface on the second display.

10. The dual screen electronic device of claim 1, wherein the first housing is detachable form the second housing at the hinge.

11. The dual screen electronic device of claim 1, wherein the first housing and the second housing are in wired communication in response to the first housing and the second housing being coupled together by the hinge, and wherein the first housing and the second housing are in wireless communication in response to the first housing and the second housing being coupled together by the hinge.

12. The dual screen electronic device of claim 1, wherein the hinge comprises a wired connection facilitating communication between the first display and the second display.

13. A dual-screen electronic device comprising: a hinge; a first housing and a second housing attached by the hinge, wherein the first housing and the second housing are detachable from one another at the hinge; a first processor contained within the first housing; a first display mounted to the first housing and in electronic communication with the first processor, wherein the first display comprises a first touch-sensitive surface; a second display mounted to the second housing and in electronic communication with the first processor, wherein the hinge comprises a wired connection facilitating communication between the first display and the second display in response to the first housing and the second housing being coupled to one another at the hinge; a first communications bus disposed in the first housing and a second communications bus disposed in the second housing, wherein the first communications bus and the second communications bus are configured to enable wireless communication between the first display and the second display in response to the first housing and the second housing be separated; and a first memory contained within the first housing and in electronic communication with the first processor, the first memory storing non-transitory instructions which, when executed by the first processor, cause the dual-screen electronic device to: display a first user interface on the first display comprising the first touch-sensitive surface; display a second user interface, different from the first user interface, on the second display; while displaying the first user interface on the first display comprising the first touch-sensitive surface and the second user interface on the second display: responsive to detecting a first user input on the first display comprising the first touch-sensitive surface, changing content of the second user interface on the second display.

* * * * *